Feb. 4, 1958     C. J. O. WOGSTAD     2,821,893
SUPPORT FOR FOUR ROW CORNPLANTER
Filed June 4, 1953     2 Sheets-Sheet 1
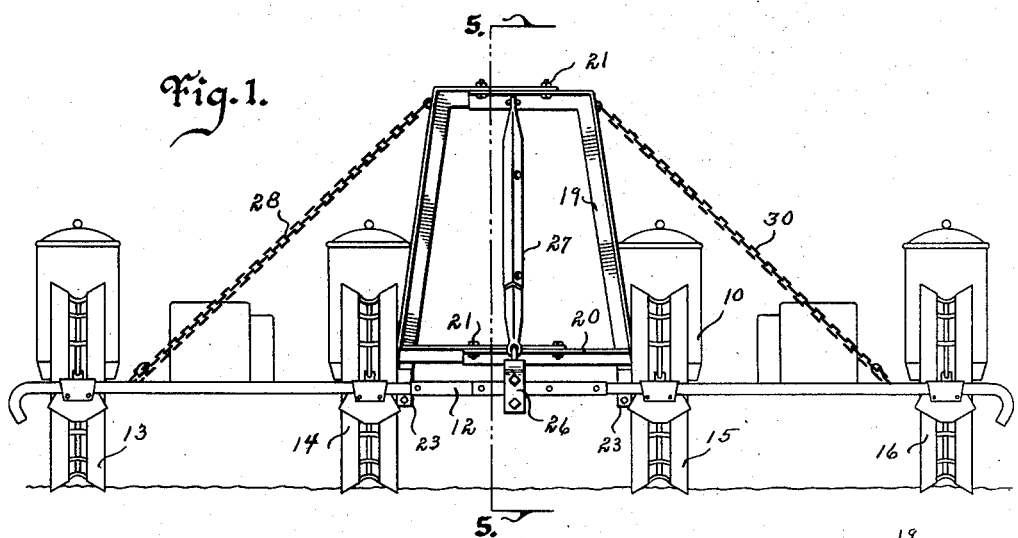
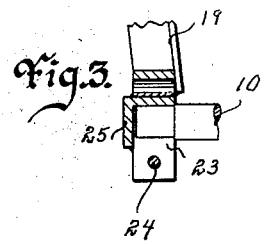
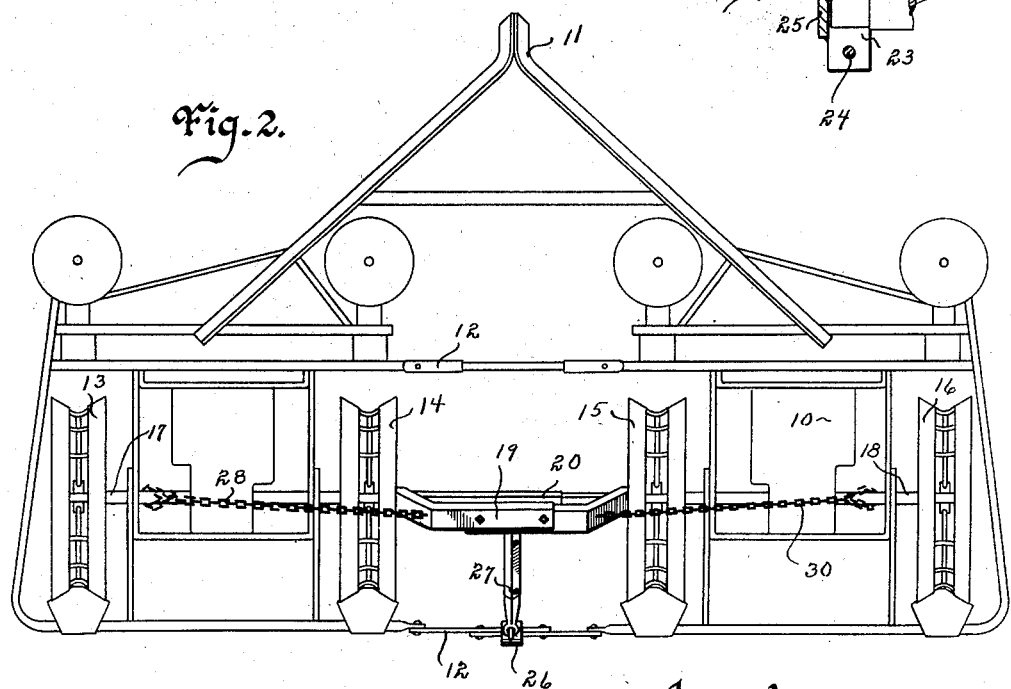
Inventor
Carl J. O. Wogstad
by Talbert Dick & Adler
Attorneys
Witness
Edward P. Seeley Feb. 4, 1958  C. J. O. WOGSTAD  2,821,893
SUPPORT FOR FOUR ROW CORNPLANTER
Filed June 4, 1953  2 Sheets-Sheet 2
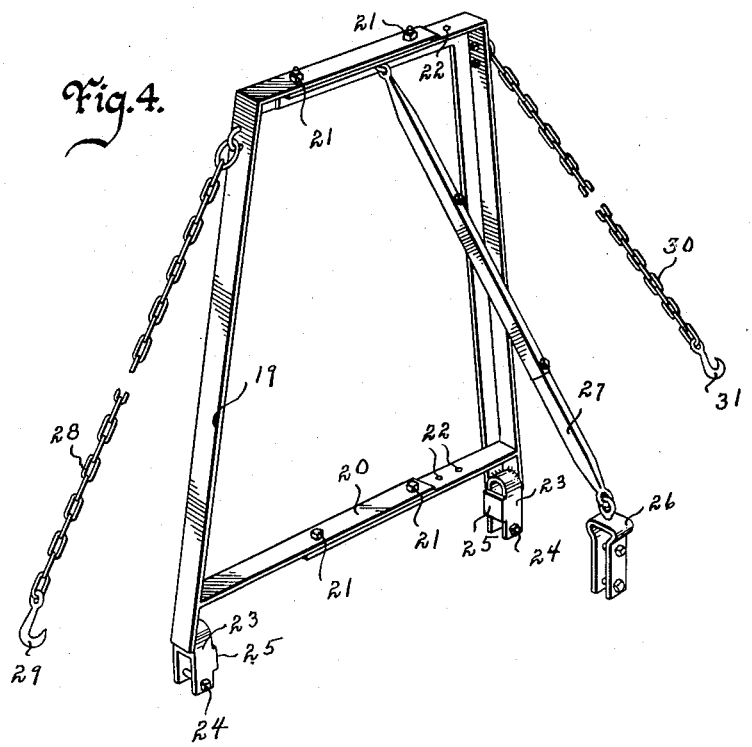
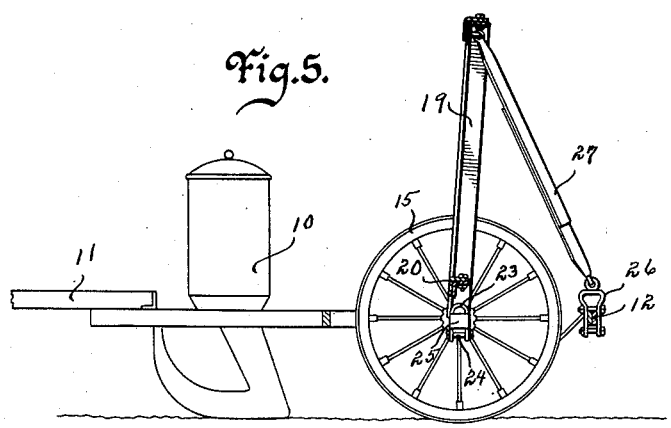
Witness
Edward P. Seeley
Inventor
Carl J. O. Wogstad
by Talbert Dick & Adler
Attorneys

United States Patent Office 2,821,893
Patented Feb. 4, 1958

2,821,893

SUPPORT FOR FOUR ROW CORNPLANTER

Carl J. O. Wogstad, Northwood, Iowa

Application June 4, 1953, Serial No. 359,464

3 Claims. (Cl. 97—235)

This invention relates to corn planters and more particularly to those planters that have a plurality of independently mounted planting units.

With the wide use of tractors, it has become imperative to speed up the time element in planting a given area. This cannot be accomplished by merely speeding up the travel of the tractor. As a matter of fact, in the planting of corn and other grains, the speed of the tractor must be held down to almost that of the speed that horses originally pulled the planter. The reason for this is that the nature of the corn planter and the process of the dropping of the kernels below the ground level does not lend itself to any material speeding up in its travel across the field.

Therefore, the procedure has had to be the increasing of the number of planting units of the planter. The result is the present day four row planter. Obviously, due to uneven ground and other factors, each of the outer planting units has individual suspension. While this is most satisfactory in the field, many problems result when the planter is moved from one field to the other and particularly so when the planter is moved down a highway, or transported in a truck or like platform. In the case of highway travel and the planter (which is relatively wide) is moved to the side or shoulder due to requirements or in passing an oncoming vehicle, the outer unit will drop downwardly into the side ditch or depression. Obviously, such a situation is objectionable, but is frequently experienced on crown type roadways. In the case of the transporting of the planter on a truck platform, the extreme outer units must be disassembled, inasmuch as a platform is of a dimension that will only extend below two of the planter units.

Therefore, the principal object of my invention is to provide a device that will render the outer planting units rigid with each other in one vertical direction when desired.

A further object is to provide a means for rigidly locking the outer planting units against downward movement relative to the others that is easily and quickly installed or removed.

Still further objects of my device are to provide a locking means for multiple corn planting units that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a rear view of my device installed and in use,

Fig. 2 is a top plan of the device installed and more fully illustrates its operation, Fig. 3 is an enlarged sectional view of one of the lower ends of the A-frame, Fig. 4 is a perspective view of my invention removed from a corn planter, and Fig. 5 is a cross sectional view of my device taken on line 5—5 of Fig. 1.

In the drawings I have shown a corn planter where the two right planting units are individually suspended relative to the two left planting units. This means that the two right outer planting units can drop downwardly independent of the two left hand units. While for illustrative purposes I have shown this type of corn planters, it will be apparent that my device will also work satisfactorily on corn planters wherein all four units are capable of independent vertical movement. Also while I show my device applied to a corn planter, it can be used on other type implements needing such supporting means.

I have used the numeral 10 to generally designate a four row corn planter having the tongue 11, jointed frame 12, and the four wheel units 13, 14, 15 and 16. The numerals 17 and 18 designate the two outer fixed axles respectively.

I will now describe my invention as applied to such a corn planter. The numeral 19 designates an A-frame made of angle iron. This frame is separated at top and cross beam 20 for width adjustment. This is accomplished by bolts 21 and holes 22 as shown in Fig. 4. At each of the lower ends of the A-frame is a bearing clamp member 23. These bearing clamps are formed as an inverted U, with a bolt 24 extending through its two lower end portions and a cross retainer 25 as shown in Fig. 3. The numeral 26 designates a rear clamp member. The numeral 27 designates a length adjustable link having one end loosely connected to the clamp 26 and its other end loosely connected to the center top of the A-frame.

The numeral 28 designates a chain or other flexible elongated member secured at one end to the upper left portion of the A-frame. The numeral 29 designates a hook member on the other and free end of the chain 28.

The numeral 30 designates an elongated flexible member, the same as the chain 28, but secured at one end to the upper right portion of the A-frame. Also on the outer end of this member 30 is a hook member which I have designated by the numeral 31.

To install my device, it is merely necessary to have the A-frame adjusted to the proper width. The lower ends of the A-frame are clamped over and secured on the two stub ends of the inner two wheel unit axles respectively, as shown in the drawings. The rear clamp is fastened to the rear frame portion of the planter and the link adjusted to support the A-frame in an upright position. The two chains are then hooked around the outer fixed axles of the outer units. The hooks on the chains make possible the adjustment of the chains to a tightened condition with all units of the planter in a horizontal plane as shown in Fig. 1. When so installed, the planter units will be maintained so that neither side end of the planter can drop below this common horizontal plane. When, say the left portion of the planter is on the highway and the right portion is on or past the shoulder, such right portion will be supported by my device and thereby be held from any dropping movement. In like manner, if the planter is placed on a truck platform and the ends of the planter extend beyond the platform area, the outer ends of the planter will be rigidly and successfully held up and supported. Even in some planting operations, it may be desirable to render the planting units non-flexible, and when such is the case, my device is ideal for this purpose.

To remove my device, it is merely necessary to detach the same, or if desired, it may be left in place and merely adjust the chains to a loose condition for permitting flexibility of the planter units.

Some changes may be made in the construction and arrangement of my support for four row cornplanters without departing from the real spirit and purpose of my invention, and it is my intention to cover by my claims, any modified forms of structure or use of mechanical equivalents which may be reasonably included within their scope.

I claim:

1. In combination with a four row cornplanter having a frame and unit axles, an A-frame, a clamp on each of the lower ends of said A-frame detachably engaging the inner axle portions of the two inner planting units respectively, a means for adjusting the width of said A-frame, a chain secured at one end to the upper portion of said A-frame, a hook on the other end of said chain detachably securing the other end of said chain to the outer axle portion of one of the outer planting units, a second chain secured to the upper portion of said A-frame, and a hook on the other end of said last mentioned chain detachably securing said last mentioned chain to the outer axle portion of one of the other outer planting units.

2. In combination with a four row cornplanter having a frame and unit axles, an A-frame, a clamp on each of the lower ends of said A-frame detachably engaging the inner axle portions of the two inner planting units respectively, a means for adjusting the width of said A-frame, a chain secured at one end to the upper portion of said A-frame, a hook on the other end of said chain detachably securing the other end of said chain to the outer axle portion of one of the outer planting units, a second chain secured to the upper portion of said A-frame, a hook on the other end of said last mentioned chain detachably securing said last mentioned chain to the outer axle portion of one of the other outer planting units, and a length adjustable link brace member extending between said planter frame and the upper portion of said A-frame.

3. In combination with a four row cornplanter having a frame and unit axles, an A-frame, a clamp on each of the lower ends of said A-frame detachably engaging the inner axle portions of the two inner planting units respectively, a means for adjusting the width of said A-frame, a chain secured at one end to the upper portion of said A-frame, a means on the other end of said chain detachably securing the other end of said chain to the outer axle portion of one of the outer planting units, a second chain secured to the upper portion of said A-frame, a means on the other end of said last mentioned chain detachably securing said last mentioned chain to the outer axle portion of one of the other outer planting units, and a length adjustable link brace member extending between said planter frame and the upper portion of said A-frame.

References Cited in the file of this patent

UNITED STATES PATENTS

| | | |
|---|---|---|
| 178,343 | Stevens | June 6, 1876 |
| 352,923 | Lancaster | Nov. 23, 1886 |
| 392,588 | Cone | Nov. 13, 1888 |
| 897,059 | Buzard | Aug. 25, 1908 |
| 1,299,073 | Wardlow | Apr. 1, 1919 |
| 1,317,282 | Faust | Sept. 30, 1919 |
| 1,360,531 | Hyatt | Nov. 30, 1920 |
| 1,529,468 | Decker | Mar. 10, 1925 |
| 1,533,143 | Ryba | Apr. 14, 1925 |
| 2,431,959 | Olson et al. | Dec. 2, 1947 |